Dec. 11, 1962   S. B. RASMUSSEN ET AL   3,067,613
TEMPERATURE TRANSDUCER DEVICE
Filed Oct. 20, 1958   2 Sheets-Sheet 1

SVEIN B. RASMUSSEN
JOHN F. WOOD
INVENTORS

BY Harvey S. Lawhurst
ATTORNEY

SVEIN B. RASMUSSEN
JOHN F. WOOD
INVENTORS

United States Patent Office 3,067,613
Patented Dec. 11, 1962

3,067,613
TEMPERATURE TRANSDUCER DEVICE
Svein B. Rasmussen, Menlo Park, and John F. Wood, Palo Alto, Calif., assignors to Link Aviation, Inc., Binghamton, N.Y., a corporation of New York
Filed Oct. 20, 1958, Ser. No. 768,334
9 Claims. (Cl. 73—362)

This invention relates to temperature transducer devices and more particularly to a temperature transducer device utilizing variation of electrical resistance with variation of temperature.

It is often desirable to measure the temperature of some medium such as solids or perhaps a liquid or gas contained in a volumic body or passing through a pipe. For example, in the oil industry it has been found necessary to constantly determine the average temperature of a liquid in a storage tank so that corrective measures may be taken when the temperature exceeds a safe limit. Likewise the temperature of liquid jet fuels during injection into a propulsion unit must be kept under constant surveillance to prevent explosion due to high temperatures. Sometimes it may be desirable to determine the temperature gradient of a gas or a liquid moving through a containing body to determine the rate of change of temperature. Numerous instances are well known to those skilled in the art where knowledge of the instantaneous temperature of a medium is essential.

Heretofore, several devices have been employed for the measurement of temperature, each being particularly suitable for some purposes. For example, the well known thermistors and sensistors may be utilized as sensing elements but have been found too inconsistent and lacking in linearity when applied to the measurement of temperature of liquids or gases. The well known thermocouple, even though providing an admirably suited temperature sensing element, requires that one of its junctions be maintained at a constant reference temperature, a requirement sometimes burdensome to satisfy.

Perhaps the simplest, most economical and reliable temperature transducer of the prior art is a resistance wire bulb thermometer which utilizes a Wheatstone type bridge wherein one of the four resistive elements comprises a material having a known temperature coefficient of resistance. This temperature sensitive resistance element is physically introduced into the liquid or gaseous medium whose temperature is to be determined while the remaining three resistive elements of the bridge remain outside the medium. The difficulty that has been experienced with this prior art resistance wire bulb thermometer is the requirement of long leads connecting the temperature sensitive resistance element to the bridge. The long leads have been found to introduce pick-up noise into the system which, of course, decreases the sensitivity appreciably. Furthermore, extensive calibration is necessary because the resistance of the long leads must be compensated for.

Additionally, the well known thermoelectric effects, always present when junctions of dissimilar metals are maintained at different temperatures, introduced spurious currents which produced erroneous temperature readings. Still further, the effective operation of the resistance wire bulb thermometer required either a constant current power source to supply a current which would not vary with the change of resistance of the temperature sensitive element or a sufficiently large impedance series connected between the source and the bridge so that the change of resistance of the bridge had little effect on the bridge current. As is well known, a constant current power source is more complex than a constant voltage power source and a large series connected impedance causes high wasteful power dissipation.

It is therefore an object of this invention to provide a temperature transducer device which is simple, economical and exhibits maximum sensitivity with minimum power dissipation.

It is a further object of this invention to provide a temperature transducer device wherein all junctions are at the same temperature.

It is also an object of this invention to provide a temperature transducer device of the bridge type which may be successfully operated with a constant voltage power source and which does not require a large source impedance with inherent and wasteful power dissipation.

It is also an object of this invention to provide a temperature transducer device of the bridge type which may be successfully operated with a constant voltage power source and which always maintains a constant bridge current.

It is a still further object of this invention to provide a temperature transducer device which has a greater accuracy and linearity and a greater sensitivity than has heretofore been possible.

It is another object of this invention to provide a temperature transducer device which is self contained and which may be packaged in a very small volume.

It is another object of this invention to provide a plurality of transducer devices so arranged as to provide an average temperature.

Other objects of the invention will in part be obvious and will in part appear hereinafter.

In accordance with one embodiment of this invention, a Wheatstone type bridge is formed by four resistance elements. Opposite pairs of resistance elements are respectively made of materials having a high and a low temperature coefficient of resistance. In this manner each side of the bridge carries one-half of the bridge current, but the voltage between the opposing load junction depends on the temperature of the bridge. To keep the total bridge current constant, one resistance element is put in series with one input junction and another resistance element is put in parallel with the input junctions. Both the compensating resistance elements must have predetermined resistance values and be of a material having a predetermined temperature coefficient of resistance. The voltage obtained from opposing load junctions provides a measure of the temperature of the bridge.

For a fuller understanding of the nature and objects of the invention, reference should be had to the following detailed description taken in connection with the accompanying drawings in which.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only and are not intended as a definition of the limits of our invention.

Figure 1:
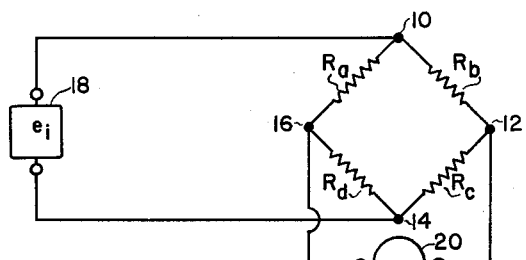
FIGURES 1–3 show schematic circiut diagrams of several embodiments of the temperature transducer of this invention.
Figure 2:
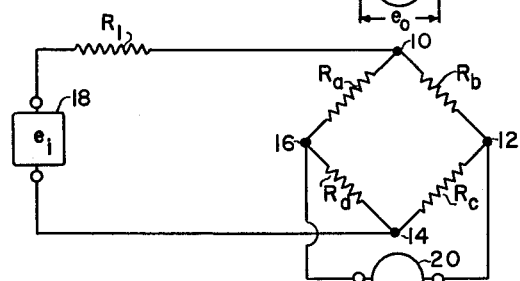
Figure 3:
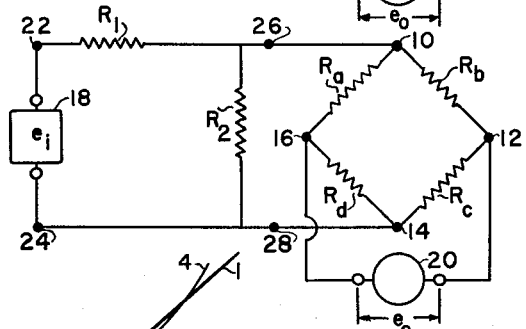

Referring now to the drawings, in which like reference characters designate like parts, and particularly to FIGURES 1 to 3 thereof, there are shown four resistance elements respectively designated by reference characters $R_a$, $R_b$, $R_c$ and $R_d$. Resistance elements $R_a$ and $R_c$ form a first opposite pair and resistance elements $R_b$ and $R_d$ form a second opposite pair. Each of the four resistance elements is connected to form a first opposite pair of junctions designated by reference characters 10 and 14 and a second opposite pair of junctions designated by reference characters 12 and 16.

A source of supply potential 18 is connected to the first opposite pair of junctions 10 and 14, and a utility device such as a vacuum tube voltmeter is connected to the second opposite pair of junctions 12 and 16. Source 18 may be a direct current or an alternating current source of potential, and device 20 may also be a microammeter or any other well known device suitable for the measurement of potential difference or current.

The resistance elements comprising one opposite pair such as $R_a$ and $R_c$ are selected so that their resistance increases with increase of temperature and the resistance elements comprising the other opposite pair such as $R_b$ and $R_d$ are selected so that their resistance either decreases, or at least increases less than $R_a$ and $R_c$ or remains constant with increase of temperature. As will be pointed out later on, the most desirable choice of $R_b$ and $R_d$ would be a material having a temperature coefficient of resistance equal and opposite to the one of $R_a$ and $R_c$. However, materials known today having a negative temperature coefficient of resistance are somewhat unreliable in their performance and consequently such resistance materials are unsuitable. The next best suited material for the purpose of this invention is one having a small temperature coefficient of resistance.

Referring now to the operation of the temperature transducer device of FIGURE 1, all four resistance elements joined together to form a bridge are inserted into the medium whose temperature is to be determined. As is well known to those skilled in the art, a bridge such as the one formed by the four resistive elements exhibits the greatest sensitivity when all four resistance elements are substantially equal in their resistance values. It is for this reason that the resistance elements are selected to have a resistance value of $R_0$ at a temperature $T_0$. Of course, each resistance value at the temperature $T_0$ may be different without departing from the spirit of this invention and the same end result is obtainable with perhaps some decrease in the sensitivity. For the purpose of keeping the mathematics as simple as possible, the analysis below assumes equal resistance values $R_0$ at temperature $T_0$. Each resistance element may now be expressed as $$R_a = R_0[1+\alpha(T-T_0)]$$
$$R_b = R_0[1+\beta(T-T_0)]$$
$$R_c = R_0[1+\gamma(T-T_0)] \quad (1)$$
$$R_d = R_0[1+\delta(T-T_0)]$$

where $R_0$ is the resistance of each resistance element at a temperature $T_0$, $\alpha$, $\beta$, $\gamma$, and $\delta$ are the temperature coefficient of resistance usually given in (ohms per ohm per degree temperature) and T is the temperature.

Assuming a constant current I flowing through the bridge, that is the current entering junction 10, output voltage $e_o$ is given by the expression $$e_o = \tfrac{1}{4} I R_0 (\alpha - \beta - \gamma - \delta)(T-T_0)$$
$$= \text{constant} \times (T-T_0) \quad (2)$$

Because $R_0$, $\alpha$, $\beta$, $\gamma$ and $\delta$ may be considered as constants, it is immediately apparent from Equation 2 that the output voltage $e_o$ is directly proportional to the temperature T provided current I remains constant. It can also be seen from Equation 2 that temperature coefficients $\alpha$ and $\delta$ as well as $\beta$ and $\delta$ form sums which are subtracted from one another, i.e. $(\alpha+\delta)-(\beta+\delta)$. Consequently this expression will be a maximum when $\alpha=\gamma$ and as large as possible, and when $\beta=\delta$ and as small as possible (preferably being a negative quantity). Such consideration leads immediately to the conclusion that in a preferred embodiment the same material should be chosen respectively for $R_c$ and $R_a$ and also for $R_d$ and $R_b$. In other words $R_a=R_c$ and $R_b=R_d$ so that $\alpha$ may be substituted for $\gamma$ and $\beta$ for $\delta$. Making such substitution in Equation 2 we get $$e_o = \tfrac{1}{2} I R_0 (\alpha - \beta)(T-T_0) \quad (3)$$

It can therefore be seen from Equation 3 that the four resistance elements $R_a$, $R_b$, $R_c$ and $R_d$ connected as shown in FIGURE 1 provide a temperature transducer device which provides temperature as a linear function of output voltage $e_o$ as long as I remains constant. This relationship is shown by curve 1, FIGURE 4, which represents a plot of the output voltage $e_o$ versus temperature T.

As indicated above, the sensitivity increases with increase of the factor $(\alpha-\beta)$, the difference between the temperature coefficients of resistance. It is then desirable to select $\alpha$ as large as possible and $\beta$ as small as possible, or even negative. One material eminently suitable for $R_a$ is marketed under the trade name "99 Alloy" by the Driver-Harris Company, Harrison, New Jersey, and is described in their catalog No. R-58, entitled "Nichrome and Other High Nickel Electrical Alloys." The manufacturer describes "99 Alloy" as being 99.8% pure nickel and having a temperature coefficient of resistance equal to .006 ohm per ohm per degree centigrade. The same catalog describes many other materials likewise suitable such as "Therlo" ($\alpha=.0033$ ohm per ohm per degree centigrade), "146 Alloy" ($\alpha=.0032$ ohm per ohm per degree centigrade), "152 Alloy" ($\alpha=.0036$ ohm per ohm per degree centigrade), "Hytemco" ($\alpha=.0045$ ohm per ohm per degree centigrade), "Manco" and "Permanickel" ($\alpha=.0036$ ohm per ohm per degree centigrade), "Gr. A Nickel" ($\alpha=.0050$ ohm per ohm per degree centigrade), and "Gr. E Nickel" ($\alpha=.0045$ ohm per ohm per degree centigrade). As is well known, the temperature coefficient of resistance is usually not constant but varies with temperature. The manufacturer also lists temperature ranges between which the coefficients are substantially constant. For example, "99 Alloy" is described as having a linear coefficient between the temperatures of $-50$ and $150°$ centigrade. Obviously, if a transducer is to be constructed for measuring temperatures up to $400°$ centigrade, a different material such as "Permanickel" is more suitable even though its coefficient is only one half that of "99 Alloy."

Selection of a material having a $\beta$ as small as possible, or even negative, is of course subject to the same restriction, namely that $\beta$ be linear over the desired temperature range to be measured. All materials investigated with negative temperature coefficient of resistance have been found to lack linearity over the range of temperatures extending say from $-50°$ F. to $500°$ F. Consequently materials with very small temperature coefficients of resistance were selected. One of these materials is marketed under the trade name "Karma" by the Driver-Harris Company, Harrison, New Jersey. The manufacturer describes "Karma" as including Ni 73% +Cm 20% +Al+Fe and having a temperature coefficient of $\pm.00002$ ohm per ohm per degree centigrade. Among other materials described in the catalog and equally suitable are "Advance" ($\pm.00002$ ohm per ohm per degree centigrade) and "Manganin" ($\pm.000015$ ohm per ohm per degree centigrade).

Selecting "99 Alloy" for $R_a$ and "Karma" for $R_b$ and the resistance value for each element as $R_0=200$ ohms at some reference temperature $T_0$, then the sensitivity of the bridge can readily be determined. With a constant current equal to 10 milliamperes, the output voltage from Equation 3 will be equal to approximately 6 millivolts per degree centigrade away from the reference temperature $T_0$ which corresponds to a sensitivity of 6 millivolts per degree centigrade.

Figure 4:
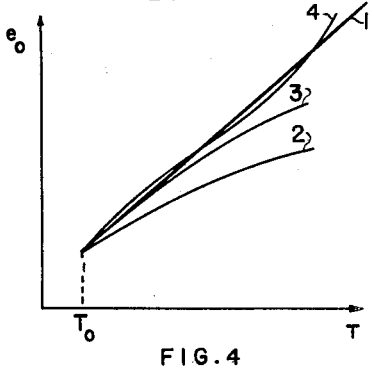
FIGURE 4 is a graph in Cartesian coordinates of temperature-resistance curves useful in explaining the operation of the transducers of FIGURES 1–3.

If source 18 is a constant voltage power source, current I will vary with the impedance of the bridge which in turn will vary with change of temperature. The input impedance to the bridge designated by character $R_T$ is given by the well known expression $$R_T = R_0 + \tfrac{1}{2}R_0(\alpha+\beta)(T-T_0) \quad (4)$$

in which $R_0$, $\alpha$, $\beta$, $T_0$ and $T$ are all quantities defined above. It is seen from Equation 4 that unless $\alpha$ and $\beta$ are of equal magnitude and opposite sign, the input impedance $R_T$ will vary with temperature and consequently current $I$ will vary as well. As mentioned hereinabove, presently known resistance materials exhibiting negative temperature coefficients of resistance are usually non-linear and therefore not practical for a temperature transducer device of this invention which is adopted for the measurement of temperature over an extended range. It is therefore necessary to look towards resistance materials having a very small temperature coefficient of resistance and compensate by addition of further resistance elements for the variation of current $I$. Curve 2, FIGURE 4, depicts the relationship between output voltage $e_0$ and temperature $T$ for a bridge such as the one shown and described in conjunction with FIGURE 1. The lack of linearity is due to the change of current $I$ with temperature $T$ when source 18 is a constant voltage power source.

FIGURE 2 shows another embodiment of the temperature transducer of FIGURE 1 having a resistance element $R_1$ serially connected between source 18 and junction 10.

If the resistance value of $R_1$ is made very large in comparison with bridge impedance $R_T$, the variation of current $I$ due to changes in bridge impedance $R_T$ caused by changes in temperature become very small and linearity between $e_0$ and $T$ is improved. However, if the magnitude of supply voltage $e_i$ remains the same, current $I$ is now appreciably decreased and consequently the sensitivity of the transducer which is directly proportioned to current $I$ is likewise decreased. Insertion of $R_1$ into the voltage supply circuit stabilizes the current $I$ at the expense of the bridge sensitivity, a result which is often undesirable. For complete stabilization, $R_1$ should have an infinite resistance which, of course, would result in a zero current $I$. If $R_1$ is substantially equal to $R_0$, the sensitivity of the transducer is decreased by a factor of approximately two. For such a circuit configuration, the relationship between output voltage $e_0$ and temperature $T$ is shown by curve 3, FIGURE 4. Curve 3 indicates some improvement but does not approach the desired linearity shown by curve 1.

FIGURE 3 shows a further embodiment of the temperature transducer device of FIGURE 1 in which the circuit means applying input voltage $e_i$ to junctions 10 and 14 includes two compensating resistance elements $R_1$ and $R_2$. Resistance elements $R_1$ and $R_2$ are arranged to form a 4-terminal L network, the 4 terminals respectively being 22, 24, 26 and 28. Both resistance elements $R_1$ and $R_2$ are selected to be temperature sensitive and having respective temperature coefficients of resistance equal to $\beta'$ and $\alpha'$. It will be shown below that $\beta'$ should be as close to zero as possible. Consequently the resistances of $R_1$ and $R_2$ at any temperature $T$ are given by the expressions $$R_1 = R_1'[1+\beta'(T-T_0)]$$
$$R_2 = R_2'[1+\alpha'(T-T_0)] \quad (5)$$

where $R_1'$ and $R_2'$ are respectively the resistance values of $R_1$ and $R_2$ at the temperature $T_0$. As will be shown below, if $R_1$ and $R_2$ are properly selected, the current $I$ through the bridge will remain constant and therefore independent of temperature $T$. An analysis of the circuit of FIGURE 3 will provide the desired relationships between $R_1$, $R_2$, $R_0$, $R_a$ and $R_b$ and their respective temperature coefficients of resistance.

Referring now particularly to FIGURE 3 and the currents $I_1$ and $I$ indicated therein, it can be shown that $$I_1 = \frac{(R_T+R_2)}{D}e_i \quad (6)$$

and $$I = \frac{R_2}{D}e_i \quad (7)$$

where $$D = R_T R_1 + R_T R_2 + R_1 R_2 \quad (8)$$

and $R_T$ is given by Equation 4, and $R_1$ and $R_2$ are given by Equation 5.

Since it is desired to have current $I$ remain constant, the normal procedure is to differentiate Equation 7 with respect to temperature $T$ and equating the derivative to zero. The resulting equation is the expression giving the proper relationship between the various resistance values and temperature coefficients that would make the current $I$ a constant. The resulting expression is, however, too complicated for the general case to be of practical value in design. The dilemma is resolved by resorting to the consideration of special cases, or approximation methods may be used. First consider the case in which the resistance elements $R_1$ and $R_b$ are assumed to have a zero temperature coefficient, i.e. $\beta=\beta'=0$, while $R_a$ and $R_2$ both have the same temperature coefficient, i.e. $\alpha=\alpha'$. In this case Equation 7 will take the form $$I = \frac{e_i}{R_1 + \dfrac{R_1'R_0}{R_2'}\left[\dfrac{1+\tfrac{1}{2}\alpha(T-T_0)}{1+\alpha(T-T_0)}\right] - R_0\left[1+\tfrac{1}{2}\alpha(T-T_0)\right]} \quad (9)$$

after substituting for $R_T$, $R_1$ and $R_2$ the expressions given by Equations 4 and 5.

Differentiating Equation 9 with respect to the temperature $T$ yields $$\frac{dI}{dT} = \frac{dI}{dD_1}\cdot\frac{dD_1}{dt}$$

$$= -\frac{e}{D_1^2}\left[\frac{R_1'R_0}{R_2'}\cdot\frac{\tfrac{1}{2}\alpha(1+\alpha(T-T_0))-\alpha\left(1+\tfrac{1}{2}\alpha(T-T_0)\right)}{(1+\alpha(T-T_0))^2} + \tfrac{1}{2}\alpha R_0\right] \quad (10)$$

in which $D_1$ represents the denominator in Equation 9. Accordingly, $dI/dT$ equals zero whenever the bracketed term in Equation 10 equals zero. This is found to be true when $$R_1' = [1+\alpha(T-T_0)]^2 R_2' \quad (11)$$

Selecting values of $R_1'$ and $R_2'$ according to Equation 11 ensures that the current will remain constant, and the output linear over a certain region of temperatures about the value of temperature represented by $T_0$ in Equation 11. Actually, the resulting linearity will not be perfect, because Equation 11 is nonlinear. However, by choosing a temperature value near mid-scale, say, $T_0=65°$ F., it will be found that the total variation in linearity between zero and $130°$ F. will not exceed $0.2°$ F. FIGURE 4, curve 4 shows the degree of linearity of $e_0$ with temperature $T$ when $R_1'$ and $R_2'$ are chosen in accordance with Equation 11. Of course, it must be kept in mind that $R_2$ is made of a resistance material having a temperature coefficient of resistance equal to $\alpha$, the same as that of $R_a$ and $R_c$ and also that $R_1$, $R_b$ and $R_d$ have been selected with a temperature coefficient of resistance which is as close to zero as possible. It may also be pointed out that $R_2$ must be maintained at the same temperature $T$ as $R_a$ and $R_c$ (and therefore the whole bridge) to provide the proper compensation to keep current $I$ constant through the bridge.

Although Equation 11 is considered useful inasmuch as it represents a rather practical case, a more general expression may be found by making suitable approximations. Substituting Equations 3, 4 and 5 into Equation 7 yields $$I = \frac{e_i}{R_1'[1+\alpha'(T-T_0)] + \frac{R_1'R_0}{R_2'} \cdot \frac{[1+\alpha'(T-T_0)]\left[1+\frac{1}{2}(\alpha+\beta)T\right]}{1-\beta'(T-T_0)} + R_0\left[1+\frac{1}{2}(\alpha-\beta)(T-T_0)\right]} \quad (12)$$

When the temperature coefficients and the temperature range are not too great, so that $\alpha(T-T_0) \ll 1$, $\beta(T-T_0) \ll 1$, etc., all terms in $\alpha(T-T_0)$, $\beta(T-T_0)$, etc., of the second or higher order, become negligible in comparison to unity. Hence Equation 12 reduces to $$I \approx \frac{e_i}{R_1'(1+\beta'T) + \frac{R_1'R_0}{R_2'}\left\{1+\left[\beta'-\alpha'+\frac{1}{2}(\alpha+\beta)\right](T-T_0)\right\} + R_0\left(1+\frac{1}{2}(\alpha+\beta)(T-T_0)\right)} \quad (13)$$

By differentiating Equation 13 with respect to temperature T, and equating to zero, it is seen that the current I will remain constant if $$R_1' = -\frac{\frac{1}{2}(\alpha+\beta)R_0R_2'}{\beta'R_2' + \frac{1}{2}(2\beta'-2\alpha'+\alpha+\beta)R_0} \quad (14)$$

Equation 11 for the simplified case or Equation 14 for the more generalized case provide the relationship between $R_1'$ and $R_2'$ which keeps current I constant. It is, of course, necessary that $R_2$, which is the resistance element having the high temperature coefficient of resistance, be at the same temperature as $R_a$. In other words, $R_2$ is part of the transducer circuit and must be immersed with the bridge into the medium whose temperature is to be measured. Since, in many cases, $R_1$ is the resistance element selected with a very low temperature coefficient of resistance, it need not necessarily be included within the temperature sensing portion of the temperature transducer device and may be regarded as a portion of the constant input voltage source 18. In actual practice it has been found convenient to insert the bridge together with resistance elements $R_1$ and $R_2$ into a suitable housing which may be hermetically sealed if desired.

Equations 11 and 14 provide the desired relationship between $R_1'$ and $R_2'$ which enables the designer to obtain one from the other. Of course there are an infinite number of different value resistance elements which may be utilized, but if $R_1$ is too large or too small there is an unnecessary waste of power and a resultant decrease of sensitivity. In general, it is desirable to keep the total power input to the transducer at a minimum while keeping the bridge current constant and the sensitivity at a given level. Such considerations will determine the most desirable value of resistance element $R_2$. The total power input to the transducer circuit of FIGURE 3 is $$W = I_1 e_1 \quad (15)$$

Substituting Equation 6 in Equation 15, and subsequently solving Equation 7 in terms of $e_i$ and substituting it into Equation 15 results in $$W = \frac{(R_1R_2 + R_TR_1 + R_TR_2)(R_T+R_2)}{R_2^2} I^2 \quad (16)$$

Further, by substituting Equation 11 in Equation 16 there results $$W = [(1+\alpha(T-T_0))]^2 R_0 + [(1\alpha(T-T_0))^2+1]\frac{R_0^2}{R_2'}$$
$$+ [1+\alpha(T-T_0)]^2 R_2' + [(1+\alpha(T-T_0))^2+1]R_0 \quad (17)$$

Differentiating Equation 17 with respect to $R_2'$ and equating to zero results in $$\frac{dW}{dR_2} = -[(1+\alpha(T-T_0))^2+1]\frac{R_0^2}{R_2'^2} + [1+\alpha(T-T_0)]^2 = 0 \quad (18)$$

Accordingly, the power input will be a minimum when $$R_2 = \frac{\sqrt{2+2\alpha(T-T_0) - \alpha^2(T-T_0)^2}}{1+\alpha(T-T_0)} R_0 \quad (19)$$

or approximately when $$R_2 = \sqrt{\frac{2}{1-\alpha(T-T_0)}} R_0 \quad (20)$$

Since Equation 11 has been used in deriving an expression of resistance element $R_2$, the expression is applicable only to the single case, that is the case where $\alpha'=\alpha$ and where $\beta'=\beta\approx 0$. However, a similar expression may be found using Equation 14 instead of Equation 11 for the more general case.

The selection of the resistance values of the various resistance elements in accordance with the above derived equations will now be demonstrated with the help of an illustrative example. To simplify the calculations it will be assumed that $R_a = R_c$ and $R_2$ comprises the same resistive material as $R_a$ and has a temperature coefficient of resistance, namely $\alpha$, equal to .0060 ohm per ohm per degree centigrade. Also $R_b = R_d$ and $R_1$ comprises the same resistive material as $R_b$ and has a temperature coefficient of resistance, namely $\beta$, so low that its variation of resistance with temperature may be neglected for all practical purposes. The temperature transducer device selected for this illustrative example is supposed to measure temperatures between 0° and 400° centigrade with a linearity of better than ½% with a sensitivity of 2 millivolts per degree centigrade. Further, the utility device 20 is assumed to be a load such as a vacuum tube voltmeter or a microammeter having a load impedance in excess of 100 kilohms. The first step would be to determine a suitable resistance for resistance element $R_0$ such that the variation of $R_T$ with temperature in view of the load impedance of 100 kilohms will provide the desired linearity. If $R_0$ is selected as 200 ohms, the linearity is easily determined to be approximately ¼% which is well within the desired ½% linearity. Having selected a suitable value for $R_0$, namely 200 ohms, $R_2$ for minimum power dissipation may be found from Equation 20 to be equal to 190 ohms if $T_0$ is taken as the mid-range temperature, that is 200° centigrade. Thereafter $R_1'$ may be determined from Equation 11 which, when the proper values are substituted therein, will work out to approximately 920 ohms. The current I necessary to provide the desired sensitivity is then obtained for Equation 3 which works out to 3.33 milliamperes. It might also be mentioned that $R_T$ will vary from a minimum value of 200 ohms to a maximum value of 440 ohms, a value easily obtained by Equation 5. To sum up the results of this illustrative example, $R_0=200$ ohms, $R_2'=190$ ohms, $R_1'=920$ ohms. If $R_0$ is changed from 200 ohms to, say, 1000 ohms, the linearity would change from ¼% to approximately ¾% and, of course, the values of $R_2'$ and $R_1'$ would have to be redetermined.

In the above description, it has been assumed that the temperature coefficient of resistance such as $\alpha$ are constant and do not vary with temperature. As is well known, almost all materials exhibit some slight non-linear change of resistance with change of temperature. The general formula may be stated to be $$R = R'(1+\alpha_1 T + \alpha_2 T^2 + \alpha_3 T^3 \ldots) \quad (21)$$

However the materials described hereinabove have been found to be sufficiently linear over a desired range of temperatures whose measurement is to be obtained. No attempt has been made to catalog all materials which exhibit sufficient linearity to be utilized with this invention. The materials given hereinabove, such as "99 Alloy" are merely representative of a class of materials particularly suited for incorporation into the temperature transducer device of this invention.

In some applications requiring very great accuracy, it may be possible to compensate for the variation of the temperature coefficient of resistance. Even though such a procedure is not necessary except when most stringent requirements are imposed upon the temperature transducer device, such compensation is useful especially when the measurements over a very extended range are desired. For resistance wires with high temperature coefficient of resistance, this variation is generally positive so that the actual temperature coefficient of resistance increases slightly with increasing temperatures. Thus, the actual temperature coefficient of resistance might be described by the functional relationship $$\alpha = \alpha_0[1 + c(T - T_0)] \quad (22)$$

The "index of curvature" $c$ may be defined as $$c = \frac{\alpha_m - \alpha_0}{\alpha_0 \cdot T_m} \quad (23)$$

where $\alpha_0$ and $\alpha_m$ are the temperature coefficient at the low and high ends of the temperature range, respectively, and $T_m$ is the total temperature range. Considering the simple case in which $\beta=0$ and current I is constant, then the expression given by Equation 3 shows a non-linear output. Also, the sensitivity of the transducer increases somewhat with increasing temperatures. This situation can be remedied to some extent by slight readjustments in the values of the resistors $R_1'$ or $R_2'$ (FIGURE 3). An estimate of the required readjustment is obtained by the considerations that follow.

Substituting Equation 9 in Equation 3 and letting $R_1=0$, and $\beta=0$, yields $$e_o = \frac{e_i \alpha(T-T_0)}{2\left[1+\frac{1}{2}\alpha(T-T_0)\right]} = \frac{e_i \cdot \alpha_0[1-c(T-T_0)](T-T_0)}{2\left[1+\frac{1}{2}\alpha(T-T_0)\right]} \quad (24)$$

This equation shows that the output voltage $e_o$ would remain an essentially linear function of temperature T if $c=\frac{1}{2}\alpha$, with $R_1$ completely removed. Hence, to a first degree of approximation, it is reasonable to assume that the output would also remain linear if $R_1$ were reduced by an amount which is equal to the ratio between $c$ and $\frac{1}{2}\alpha$. Thus a new value for $R_1'$, termed $R_1''$, could be computed from the formula $$R_1'' = R_1'\left(1 - \frac{2c}{\alpha}\right) \quad (25)$$

in which $R_1'$ is the value computed from Equation 11, $c$ is given by Equation 23 and $\alpha$ is the average temperature coefficient over the operating range of temperatures. For example, if such an adjustment is made to the resistance element $R_1'$ from the illustrative example (assuming $c=0.0002$ ohm per ohm per degree centigrade) its resistance value changes from 920 ohms to 860 ohms.

Similar compensation can be made by adjusting the value of $R_2$; and a combination of adjustments involving a slight decrease in the value of $R_1$ and a slight increase in the value of $R_2$ is also feasible.

It is also readily demonstrated that, by a similar procedure, the effect of loading the transducer can be compensated for. Such loading effect might result from a necessity of connecting it to a detector device of relatively low input impedance. In this case the compensation would involve an increase in the value of $R_1$, or a decrease in the value of $R_2$, or a combination of both of these adjustments.

Often it is desired to measure the temperature of a large body of liquid (or gas) having a non-homogeneous temperature distribution either due to environmental conditions or to adding additional liquid (or gas) at a different temperature. For such applications, it may be found convenient to utilize more than one of the temperature transducer devices of this invention. Under such circumstances, each transducer device may be provided with its own constant voltage power supply 18 and detector device 20 or the input and output terminals 22, 24, 12 and 16 respectively may be combined with one another so that a single source and a single detector may be employed. Of course, such a combination of transducers, and especially a single output detector device will provide (if properly combined) an output indicative of the average temperature, a quantity often found very desirable.

Figure 5:
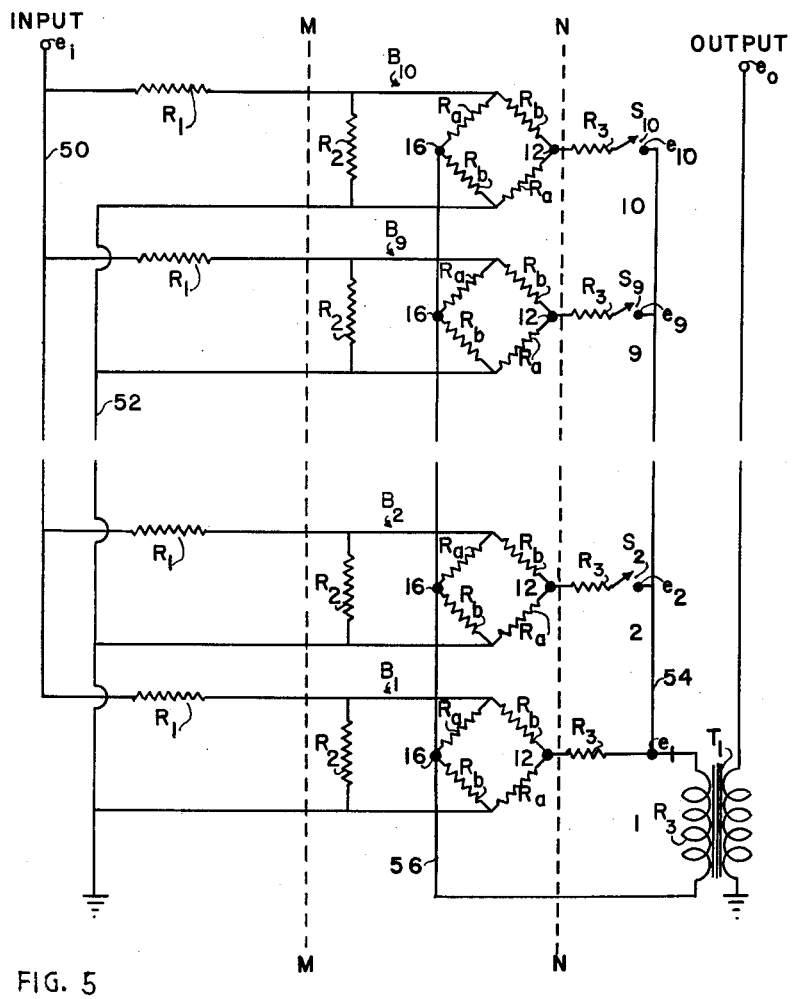
FIGURE 5 shows a schematic circuit diagram of a multi-transducer device having parallel inputs and parallel outputs and useful for determining average temperatures.

Referring now to FIGURE 5, there is shown by way of example an arrangement for combining a plurality of temperature transducer devices to obtain an output voltage indicative of the average temperature. The particular arrangement shown may be referred to as paralleled inputs and paralleled outputs. The output voltage $e_o'$ is the average of the individual output voltage $e_1, e_2 \ldots e_9$ and $e_{10}$ and consequently provides the average temperatures of the individual bridges. Each transducer device, designated by reference character $B_1, B_2 \ldots B_9$ and $B_{10}$ is constructed in accordance with description of FIGURE 3. Busses 50 and 52 provide the common input leads paralleling the inputs. Bus bar 52 is grounded and bus bar 50 is connected to a constant voltage power source $e_1$. A load resistance $R_3$ is coupled in series with output junction 12 of each transducer and connects that junction to common output lead 54. The other output lead 56 is directly connected to output junction 16 of each transducer. Leads 54 and 56 provide the paralleled outputs and are connected to opposite ends of the same winding of a transformer $T_1$, the other winding of which has one end joined to the common output terminal $e_o$ and the other end grounded. Dashed lines M—M and N—N indicate the normal confines of the fluid into which the transducer bridge circuits are immersed. Thus, as heretofore indicated, the four resistors $R_a$ and $R_b$ constituting each bridge circuit together with the shunt resistor $R_2$ associated therewith are immersed in the fluid medium. Switches $S_2 \ldots S_9$ and $S_{10}$ are activated either manually or automatically by a float switch when the respective transducer is immersed in the medium whose temperature is to be measured. Usually all tranducers are arranged vertically inside a large storage tank to measure the average temperature of the medium contained therein. Of course, only those transducers which are actually immersed in the medium are desired to contribute to the average temperature reading so that a preferred embodiment contemplates some automatic means for closing the switches $S_2$–$S_{10}$.

In some applications, the average temperature of a medium (liquid or gas) flowing through a nozzle, construction, or just a pipe may be measured by arranging the transducers along the direction of flow. For such applications, no switches are required since each transducer is in contact with the medium.

The averaging system shown in FIGURE 5 is unique in that there is no basic need for input or output transformers. Thus, the system could be used with a D.-C. as well as an A.-C. supply source. Operation with D.-C. would, however, require the use of an error detector with a floating of differential input.

It is readily shown that the output voltage of the system shown in FIGURE 5 is $$e_O = \frac{\sum_{n=1}^{n} \frac{e_n}{(R_3+R_T)_n}}{\sum_{n=1}^{n} \frac{1}{(R_3+R_T)_n} + \frac{1}{R_L}} \quad (26)$$

where $R_T$ is the bridge impedance in accordance with Equation 4, $R_3$ is the load resistance, $R_L$ is the load resistance of the winding of transformer $T_1$, $(R-R_T)_n$ is the total resistance of $B_n$, and $e_n$ is the output voltage of $B_n$.

Solving Equation 26 after inserting the temperature dependent terms will show that $e_o$ provides a measure of the average temperature of the system with negligible error.

Other methods for averaging, such as parallel inputs with series outputs, or series inputs with parallel outputs, or series inputs with series outputs, have been considered and may be found useful in special cases and will be obvious to those skilled in the art. Transformers with multiple taps are often considered in schemes of this sort.

There has been described a temperature transducer device comprising a temperature sensitive bridge wherein one opposing pair of branch arms includes resistance elements having a high temperature coefficient of resistance and the other opposing pair of branch arms includes resistance elements having a low temperature coefficient of resistance. The difference between the high and the low temperature coefficients is directly proportional to the sensitivity of the transducer and should, in most applications, be as high as possible. It is to be understood, however, that the teachings of this invention encompass transducers of low sensitivity so that the difference between the temperature coefficients need not necessarily be high. It must also be taken into account that the greater the desired range of temperatures to be measured, the smaller the choice of suitable temperature sensitive resistance materials having the required linearity over the desired range.

There has also been described the utilization of compensating resistance elements and the method of determining their resistive values and the desired dependency on temperature to maintain the bridge current I constant. The detecting means described as a vacuum tube voltmeter or microammeter may, of course, take other forms such as a nulling device where a portion of the input voltage is compared to the output voltage. In such detecting systems, it will not be necessary to provide a constant voltage power source since any variation in the input voltage is reflected by the output voltage. Consequently, if a transducer system independent of the magnitude of the input voltage is desired, a ratio voltmeter or nulling detector may be employed.

There has also been described an arrangement of several transducers interconnected to provide an output voltage which is proportional to the average temperature of the several transducers.

Although the invention has been described with a certain degree of particularity, it is understood that the present disclosure has been made only by way of example and that numerous changes in the details of construction and combination and arrangement of parts may be resorted to without departing from the spirit and scope of the invention as hereafter claimed.

What is claimed is:

1. A temperature transducer comprising: a first and a second opposing pair of resistance elements joined at their extremities to form an input and an output opposing pair of junctions, said first opposing pair of resistance elements having a high temperature coefficient of resistance and said second opposing pair of resistance elements having a coefficient of resistance substantially equal to zero; circuit means for applying an input potential coupled to said first opposing pair of junctions, said circuit means including a first compensating resistance element in series with said input junctions and having a temperature coefficient substantially equal to zero, said circuit means also including a second compensating resistance element in parallel with said input junctions and having a high temperature coefficient of resistance, said first and said second compensating resistance elements having predetermined resistive values to maintain a constant current through said input junctions; and detection means for obtaining an indication of the output potential coupled to said output opposing pair of junctions.

2. A sensitive temperature transducer bridge circuit, comprising in combination, first and second resistances having a high temperature coefficient of resistance connected as opposite legs of a Wheatstone bridge circuit, third and fourth resistances having a low temperature coefficient of resistance connected as opposite legs of said bridge circuit, said first and fourth resistances being interconnected at a first input terminal, said second and third resistances being interconnected at a second input terminal, said first and third resistances being interconnected at a first output terminal, said second and fourth resistances being interconnected at a second output terminal, and means for applying a constant current to said input terminals, said means including a fifth resistance in series with said input terminals and a sixth resistance in parallel with said input terminals, said fifth resistance having a temperature coefficient of resistance equal to that of said third and fourth resistances and said sixth resistance having a temperature coefficient of resistance equal to that of said first and second resistances.

3. A transducer according to claim 2 in which said first, second, third and fourth resistances have a resistive value equal to $R_0$, said sixth resistance has a resistive value $R_2$ substantially equal to $$\sqrt{\frac{2}{1+\alpha T_R}R_0}$$

and said fifth resistance has a resistive value $R_1$ substantially equal to $(1+\alpha T_R)^2 R_2$, each resistive value being given in ohms at a reference temperature $T_0$, where $\alpha$ is the value of said high temperature coefficient of resistance in ohms per ohm per degree centigrade and $T_R$ is one-half of the total desired temperature range in degrees.

4. A sensitive temperature transducer bridge circuit, comprising in combination, first and second resistances having a high temperature coefficient of resistance connected as opposite legs of a Wheatstone bridge circuit, third and fourth resistances having a low temperature coefficient of resistance connected as opposite legs of said bridge circuit, said first and fourth resistances being interconnected at a first input terminal, said second and third resistances being interconnected at a second input terminal, said first and third resistances being interconnected at a first output terminal, said second and fourth resistances being interconnected at a second output terminal, a fifth resistance being connected in series with one of said input terminals, and a sixth resistance having a high temperature coefficient of resistance and being connected in parallel with said input terminals, said fifth and sixth resistances having selected resistive values and selected temperature coefficients of resistance to maintain constant current through said input terminals, the difference between said high and said low temperature coefficients of resistance being in excess of 0.00010 ohm per ohm per degree centigrade.

5. A temperature transducer device suitable for the measurement of temperature and comprising: a first, second, third, fourth, fifth and sixth resistance element having respectively first, second, third, fourth, fifth and sixth temperature coefficients of resistance, said first and third and said second and fourth resistance elements respectively forming opposing pairs of arms of a Wheatstone bridge circuit, said bridge circuit having a pair of opposing input terminals, said fifth and sixth resistance elements being respectively in parallel and in series with said pair of opposing input terminals, the smallest one of said first, third and fifth temperature coefficients of resistance being larger than the largest one of said second, fourth and sixth temperature coefficients of resistance; and means for applying a constant voltage to said pair of opposing input terminals.

6. A temperature transducer device according to claim 5 in which said first, third and fifth temperature coefficients of resistance are substantially equal.

7. A temperature transducer device according to claim 5 in which the resistance of said second and fourth resistance elements are substantially equal to $R_0$, the resistance of said first and third resistance elements are substantially equally to $R_0(1+\alpha T)$, the resistance of said fifth resistance element is substantially equal to $$\sqrt{\frac{2}{1+\alpha T_R}} R_0(1+\alpha T)$$

the resistance of said sixth resistance element is substantially equal to $$(1+\alpha T_R)^2 \sqrt{\frac{2}{1+\alpha T_R}} R_0$$

where $\alpha$ is the temperature coefficient of resistance, $T_R$ is one-half of the total desired temperature range, and $T$ is the instantaneous temperature.

8. A device for measuring the average temperature of a medium comprising: a plurality of temperature transducers, each transducer including first and second opposing pairs of resistance elements joined at their extremities to form opposing pairs of input and output terminals, said first opposing pair of resistance elements having a high temperature coefficient of resistance and said second opposing pair having a low temperature coefficient of resistance, each of said transducers further including a first compensating resistance element in series with said opposing pairs of input terminals and having a low temperature coefficient of resistance and a second compensating resistance element in parallel with said opposing pair of input terminals having a high temperature coefficient of resistance, the resistance values of said first and second compensating resistance elements being selected to maintain the current from a constant voltage source through said opposing pairs of input terminals constant; a source of constant voltage; circuit means for coupling said source to each of the opposing pairs of input terminals of said plurality of transducers; a common detector device; and circuit means for coupling said common detector device to each of the opposing pairs of output terminals of said plurality of transducers.

9. Apparatus for measuring temperature of a fluid medium, said apparatus comprising a Wheatstone bridge including four resistance elements connected together to provide a first pair of opposite connections constituting input junctions and a second pair of opposite connections constituting output junctions, an input potential supply circuit coupled to the input junctions, and a detection means coupled to the output junctions, a first opposite pair of the resistance elements of the Wheatstone bridge having a high temperature coefficient of resistance and being positioned within the medium whereby the resistance thereof will vary as the temperature of the medium may vary, said input circuit including a first resistance element connected in series with an input junction of the Wheatstone bridge and a second resistance element connected in parallel with the input junctions of the Wheatstone bridge, said second resistance element of the input circuit having a high temperature coefficient of resistance and being positioned within the medium whereby the resistance thereof will vary as the temperature of the medium may vary and corresponding to a variation of the resistance of the first opposite pair of resistance elements of the Wheatstone bridge, a second opposite pair of the resistance elements of the Wheatstone bridge and the first resistance element of the input circuit being substantially constant in resistance value regardless of temperature variation of the fluid medium.

References Cited in the file of this patent

UNITED STATES PATENTS

| 1,494,586 | Cary | May 20, 1924 |
| 1,974,187 | Malpass | Sept. 18, 1934 |
| 2,040,285 | Tietz et al. | May 12, 1936 |
| 2,238,015 | Doll | Apr. 8, 1941 |
| 2,271,975 | Hall | Feb. 3, 1942 |
| 2,461,425 | Kelly | Feb. 8, 1949 |

FOREIGN PATENTS

| 11,765 | Great Britain | 1902 |

UNITED STATES PATENT OFFICE
CERTIFICATE OF CORRECTION

Patent No. 3,067,613                            December 11, 1962

Svein B. Rasmussen et al.

It is hereby certified that error appears in the above numbered patent requiring correction and that the said Letters Patent should read as corrected below.

In the grant, lines 2 and 3, for "assignors to Link Aviation, Inc., of Binghamton, New York, a corporation of New York," read -- assignors to General Precision, Inc., a corporation of Delaware, --; line 12, for "Link Aviation, Inc., its successors" read -- General Precision, Inc., its successors --; and in the heading to the printed specification, lines 4 and 5, for "assignors to Link Aviation, Inc., Binghamton, N. Y., a corporation of New York" read -- assignors to General Precision, Inc., a corporation of Delaware --.

Signed and sealed this 3rd day of September 1963.

(SEAL)
Attest:

ERNEST W. SWIDER                                   DAVID L. LADD
Attesting Officer                                      Commissioner of Patents